H. W. KIRCHNER.
SPRING WHEEL.
APPLICATION FILED DEC. 10, 1912.

1,126,031.

Patented Jan. 26, 1915.

Witnesses:
Geo. R. Ladson
Cora Badger

Inventor
Henry W. Kirchner
By Bakewell & Church Attys.

UNITED STATES PATENT OFFICE.

HENRY W. KIRCHNER, OF ST. LOUIS, MISSOURI.

SPRING-WHEEL.

1,126,031.

Specification of Letters Patent.

Patented Jan. 26, 1915.

Application filed December 10, 1912. Serial No. 735,969.

*To all whom it may concern:*

Be it known that I, HENRY W. KIRCHNER, a citizen of the United States, residing at St. Louis, Missouri, have invented a certain new and useful Improvement in Spring-Wheels, of which the following is a full, clear, and exact description, such as will enable others skilled in the art to which it appertains to make and use the same.

This invention relates to wheels, and particularly to vehicle wheels of the type in which one or more springs are arranged between the hub and rim portions of the wheel for absorbing the shocks and jars that the rim portion receives when the wheel is in service.

The main object of my invention is to provide a wheel whose hub and rim portions are connected together by one or more spirally wound springs whose cross sectional area is sufficient to impart great lateral strength or stiffness to the wheel.

Another object is to provide a vehicle wheel of the type above-described in which the spring or springs that are arranged between the hub and rim portions of the wheel coöperate with side plates on said hub and rim portions to hold said portions in vertical alinement when one or the other is subjected to side thrusts or lateral strains.

Other objects and desirable features of my invention will be hereinafter pointed out.

Figure 1:
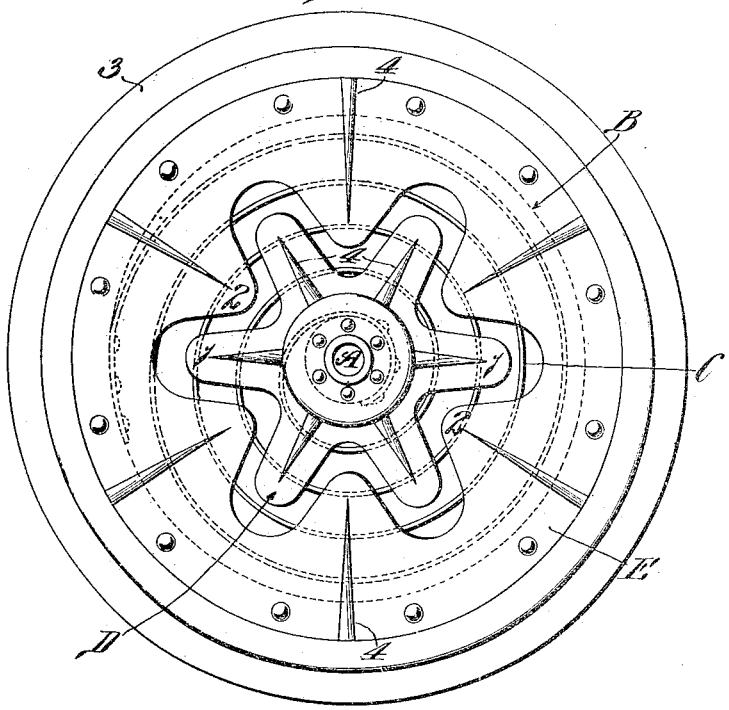
Figure 2:
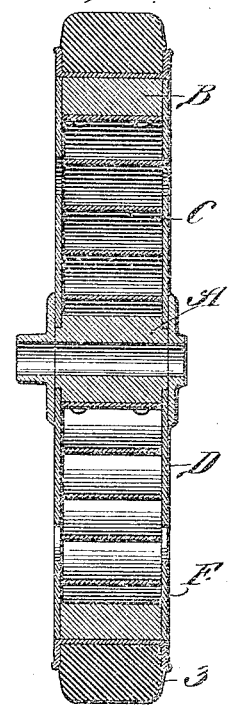
Figure 3:
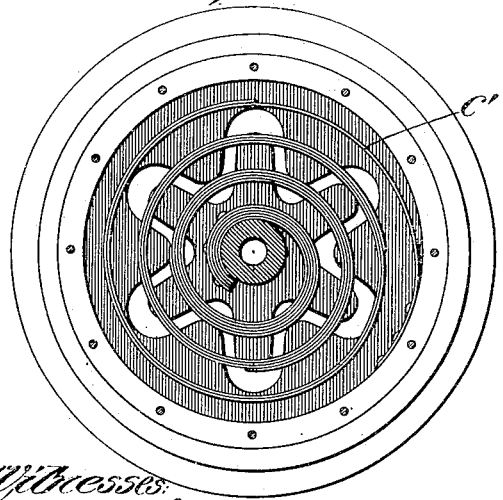
Figure 4:
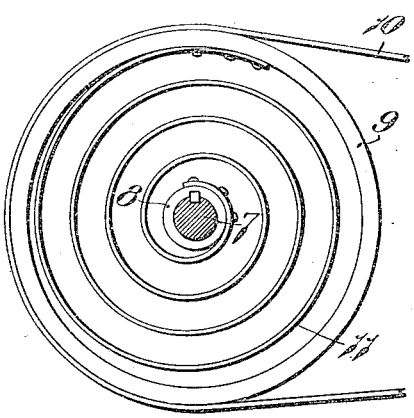

Figure 1 of the drawings is a side elevational view of a vehicle wheel constructed in accordance with my invention; Fig. 2 is a vertical cross sectional view of said wheel; Fig. 3 is a vertical longitudinal sectional view; and Fig. 4 is a side elevational view of a pulley or belt-driving wheel constructed in accordance with my invention.

Referring to Figs. 1 and 2 of the drawings which illustrate the preferred form of my invention, A and B designate the hub and rim portions of the wheel, respectively, and C designates a flat spirally wound spring that is arranged between said portions and which is secured at its outer end to the rim B and at its inner end to the hub A. The spring C absorbs the shocks and jars which the rim receives when the wheel is in service, and the cross-sectional area of said spring is great enough to impart great lateral strength or stiffness to the wheel. As shown in Fig. 2 the spring C consists of a flat strip of spring metal which is approximately the same width as the rim B and hub A but I do not wish it to be understood that my invention is limited to this exact construction. In order to insure perfect vertical alinement of the hub and rim portions under all conditions I have provided the hub and rim with pairs of side plates D and E, respectively, that coöperate with the spring C to prevent relative lateral movement of the hub and rim portions when one or the other of said portions is subjected to side thrusts or lateral strains. The inner edges of the side plates E on the rim are spaced away from the outer edges of the side plates D on the hub so as to permit the hub and rim portions to move relatively to each other in a vertical plane when the wheel is in service, and in order to eliminate the possibility of one coil or section of the spring moving laterally through the slot between the edges of the side plates D and E and thus being subjected to undue strain when one portion of the wheel is subjected to a side thrust, I have designed the plates D and E in such a manner that the slots between the edges of same are of irregular shape or outline. In the preferred form of my invention as herein shown, the side plates D on the hub are substantially star-shaped or are provided with a number of spaced arms 1 that project radially from the hub, and the side plates E on the rim have their inner edges shaped to conform to the outline of the hub plates so that inwardly projecting arms or portions 2 of the side plates E on the rim will lie between the arms or radially projecting portions 1 of the hub plates. By forming the plates D and E in this manner I obtain sinuous-shaped slots between the edges of said plates which permit the hub and rim portions of the wheel to move relatively to each other in a vertical plane but still there is no possibility of the spring C moving laterally through either of said slots owing to the fact that the coils of the spring cross said slots instead of extending parallel or longitudinally of same. When one portion of the wheel is subjected to a side thrust or lateral strain the spaced arms on the side plates of said portion will exert lateral pressure on the spring C and said spring will transmit this pressure to the coöperating spaced arms on the side plates of the other portion of the wheel, thereby preventing one portion of the wheel from moving laterally with relation to the other portion of the wheel. The spring C can be formed from a single flat strip of spring material, as shown in Figs. 1 and 2, or it can be built up from a number of strips so as to form a laminated spring C', as shown in Fig. 3. The rim portion B of the wheel is provided with a tread or tire 3, preferably formed of rubber, and the side plates on both the hub and rim portions are provided with radially disposed ribs 4 that reinforce and strengthen said plates.

While the preferred embodiment of my invention consists of a vehicle wheel constructed in the manner above-described, still my broad idea is applicable to other kinds of wheels or wheels that are used for other purposes. Therefore, I have illustrated in Fig. 4 of the drawings, a pulley or belt-driving wheel constructed in accordance with my invention. Referring to said figure, the reference character 7 designates a driving shaft, 8 designates the hub of the pulley which is securely fastened to said driving shaft, and 9 designates the rim of the pulley around which a belt 10 passes. A spirally-wound spring 11 is arranged between the hub and rim 8 and 9, respectively, and is securely connected to said parts so as to transmit movement from the hub to the rim or vice versa, said spring permitting sufficient relative movement between the hub and rim to cause the rim to exert yielding pressure on the belt 10 and thus hold said belt taut without the aid of a belt-tightening device such as is generally used with a rigid pulley.

Having thus described my invention, what I claim as new and desire to secure by Letters Patent is:

1. A wheel consisting of a hub portion, a rim portion, a broad flat spiral spring connecting said hub and rim portions, plates connected to each side of said hub portion and engaging the side edges of some of the coils of said spring, and plates connected to each side of said rim portion and engaging the side edges of the balance of the coils of said spring, each of said plates being provided with a plurality of integral radial arms, the arms on the plates that are connected to the hub portion projecting outwardly into the spaces between the arms on the plate that is connected to the rim portion, the side edges of adjacent arms being normally out of engagement with each other when the wheel is in service.

2. A wheel consisting of a hub portion, a rim portion, a broad flat spiral spring connecting said hub and rim portions, sheet metal plates connected to each side of said rim portion that engage the side edges of some of the coils of said spring and which are provided at their inner edges with a plurality of cut-out portions, and sheet metal plates connected to each side of said hub portion that engage the side edges of the balance of the coils of said spring and which are provided with a plurality of integral radial arms that are of less width than the width of said cut-out portions, and which lie in the open spaces formed by said cut-out portions and are normally spaced away from the side edges thereof when the wheel is in service.

3. A wheel comprising a hub portion, a rim portion, a wide flat spiral spring connecting said hub and rim portions, a substantially star-shaped plate secured to each side of said hub portion and provided with a plurality of radial reinforcing ribs that extend outwardly to a point adjacent the ends of the points or arms of said star-shaped plate, a plate secured to each side of said rim portion that lies in the same vertical plane as its companion star-shaped plate on the same side of the wheel and which is provided with a plurality of cut-out portions on the inner edge thereof, the edges of said cut-out portions surrounding the points or arms of said star-shaped plate and being normally spaced away therefrom, and a plurality of radially disposed reinforcing ribs arranged on each of the plates that are connected to the rim portion and which extend inwardly between said cut-out portions.

In testimony whereof I hereunto affix my signature in the presence of two witnesses, this third day of December, 1912.

HENRY W. KIRCHNER.

Witnesses:
WELLS L. CHURCH,
GEORGE BAKEWELL.